(12) United States Patent
Ikegami (10) Patent No.: US 8,805,012 B2
(45) Date of Patent: Aug. 12, 2014

(54) MONITORING STATE DISPLAY APPARATUS, MONITORING STATE DISPLAY METHOD, AND MONITORING STATE DISPLAY PROGRAM

(75) Inventor: Teruya Ikegami, Tokyo (JP)

(73) Assignee: NEC Corporation, Tokyo (JP)

( * ) Notice: Subject to any disclaimer, the term of this patent is extended or adjusted under 35 U.S.C. 154(b) by 68 days.

(21) Appl. No.: 13/512,192

(22) PCT Filed: Nov. 4, 2010

(86) PCT No.: PCT/JP2010/069591
§ 371 (c)(1),
(2), (4) Date: May 25, 2012

(87) PCT Pub. No.: WO2011/065196
PCT Pub. Date: Jun. 3, 2011

(65) Prior Publication Data
US 2012/0263349 A1   Oct. 18, 2012

(30) Foreign Application Priority Data

Nov. 27, 2009   (JP) .................................. 2009-270078

(51) Int. Cl.
*G06K 9/00* (2006.01)
*G06K 9/46* (2006.01)

(52) U.S. Cl.
USPC .......................................... 382/103; 382/195

(58) Field of Classification Search
USPC ........... 382/103, 100, 195; 345/581, 629, 630
See application file for complete search history.

(56) References Cited

U.S. PATENT DOCUMENTS

| | | | |
|---|---|---|---|
| 6,577,319 B1 * | 6/2003 | Kashiwagi et al. | 345/581 |
| 7,991,617 B2 * | 8/2011 | Matsumoto | 704/270 |
| 2007/0271373 A1 | 11/2007 | Matsumoto et al. | |

FOREIGN PATENT DOCUMENTS

| | | |
|---|---|---|
| JP | 2000-155559 A | 6/2000 |
| JP | 2007-310762 A | 11/2007 |

* cited by examiner

*Primary Examiner* — Yon Couso
(74) *Attorney, Agent, or Firm* — Sughrue Mion, PLLC (57) ABSTRACT

The present invention allows to grasp a problem area of a system quickly and accurately. The present invention has: a reference position allocation unit 13 that allocates reference positions, when displaying indexes to indicate a plurality of monitoring targets on a display area, to the indexes respectively; a data acquisition unit 11 that acquires monitoring data on the monitoring targets; a significance level determination unit 12 that determines a significance level of monitoring for each of the monitoring targets based on the content of the monitoring data; a display position change unit 14 that changes positions where indexes of monitoring targets existing around a significant monitoring target are displayed to post-movement positions which are concentrically scattered from the index of the significant monitoring target, so that the index of the significant monitoring target, which corresponds to the significance level higher than normal, does not overlap with the indexes of the other monitoring targets on the display area; and a display control unit 15 that displays the indexes on the display area based on the reference positions and the post reference positions.

8 Claims, 11 Drawing Sheets

| MONITORING TARGET ID | RESPONSE TIME | OPERATION STATE |
|---|---|---|
| 00001 | 15 SECONDS | OPERATING |
| 00002 | 10 SECONDS | OPERATING |
| 00003 | 12 SECONDS | OPERATING |
| 00004 | — | STOPPING ACCORDING TO OPERATION SCHEDULE |
| ... | ... | ... |
| 00101 | 10 SECONDS | OPERATING |
| 00102 | 38 SECONDS | OPERATING |
| 00103 | 14 SECONDS | OPERATING |
| ... | ... | ... |
| 01101 | 8 SECONDS | OPERATING |
| 01102 | — | STOPPING DESPITE OPERATION SCHEDULE |
| 01103 | 22 SECONDS | OPERATING |
| ... | ... | ... |

Fig. 3

| SIGNIFICANCE LEVEL | DETERMINATION CONDITIONS |
|---|---|
| VIOLATION (HIGH) | RESPONSE TIME: 60 SECONDS OR MORE, OR OPERATION STATE: STOPPING DESPITE OPERATION SCHEDULE |
| WARNING (INTERMEDIATE) | RESPONSE TIME: 30 SECONDS OR MORE, LESS THAN 60 SECONDS |
| NORMAL (LOW) | RESPONSE TIME: LESS THAN 30 SECONDS |
| NORMAL STOP (LOWEST) | OPERATION STATE: STOPPING ACCORDING TO OPERATION SCHEDULE |

| MONITORING TARGET ID | RESPONSE TIME | OPERATION STATE | SERVICE ID |
|---|---|---|---|
| 00001 | 15 SECONDS | OPERATING | S001, S002 |
| 00002 | 110 SECONDS | OPERATING | S001, S002 |
| 00003 | 12 SECONDS | OPERATING | S003, S004, S005 |
| 00004 | — | STOPPING ACCORDING TO OPERATION SCHEDULE | S003, S004, S005 |
| ... | ... | ... | |
| 00101 | 10 SECONDS | OPERATING | S017 |
| 00102 | 8 SECONDS | OPERATING | S018, S019 |
| 00103 | 14 SECONDS | OPERATING | S018, S019 |
| ... | ... | ... | |
| 01101 | 8 SECONDS | OPERATING | S222 |
| 01102 | — | STOPPING DESPITE OPERATION SCHEDULE | S223, S224 |
| 01103 | 90 SECONDS | OPERATING | S224, S225 |
| ... | ... | ... | |

| MONITORING TARGET ID | RESPONSE TIME | OPERATION STATE | |
|---|---|---|---|
| 00001 | 15 SECONDS | OPERATING | ▲ |
| 00002 | 10 SECONDS | OPERATING | |
| 00003 | 12 SECONDS | OPERATING | |
| 00004 | 8 SECONDS | OPERATING | |
| 00005 | 19 SECONDS | OPERATING | |
| 00006 | 5 SECONDS | OPERATING | ▼ |

Fig. 11

| | MONITORING TARGET ID | RESPONSE TIME | OPERATION STATE | |
|---|---|---|---|---|
| 931 → ⊗ | 01102 | — | STOPPING DESPITE OPERATION SCHEDULE | ▲ |
| 932 → ! | 01103 | 90 SECONDS | OPERATING | |
| | | | | |
| | | | | |
| | | | | ▼ |

MONITORING STATE DISPLAY APPARATUS, MONITORING STATE DISPLAY METHOD, AND MONITORING STATE DISPLAY PROGRAM

This application is a National Stage of International Application No. PCT/JP2010/069591 filed Nov. 4, 2010, claiming priority based on Japanese Patent Application No. 2009-270078 filed Nov. 27, 2009, the contents of all of which are incorporated herein by reference in their entirety.

The present invention relates to a monitoring state display apparatus, a monitoring state display method and a monitoring state display program.

BACKGROUND

In the operational management work of a system, it is necessary to constantly monitor the operation state of the monitoring target resources and services, so that when a failure occurs, the problem area can be quickly specified and fixed. Non-Patent Document 1 discloses an integrated management tool which integrates monitoring information collected from the monitoring targets in one integrated console, and manages the entire system at one location.

[Non-Patent Document 1] Integrated system operational management, JP1, Version 9, Hitachi Ltd. Catalog, pp. 5-6, Monitoring, searched on Nov. 11, 2009, Internet <URL: http://www.hitachi.co.jp/Prod/comp/soft1/download/catalog/ca/ca740.pdf>

In the case of the integrated management tool disclosed in Non-Patent Document 1, grouped monitoring targets are displayed in a tree structure. Therefore if there are many monitoring targets, the administrator must repeat the scrolling operation and switching operation on screen to locate a monitoring target where failure has occurred, and this takes time to specify a problem area. It is also possible that the administrator may miss the problem area while executing a repeat operation.

SUMMARY

With the foregoing in view, it is an object of the present invention to provide a monitoring state display apparatus, monitoring state display method and monitoring state display program which can quickly and accurately grasp a problem area in a system.

The monitoring state display apparatus according to the present invention comprises: reference position allocation means for allocating reference positions, when displaying indexes indicating a plurality of monitoring targets on a predetermined display area, to the indexes respectively; monitoring data acquisition means for acquiring monitoring data on the monitoring targets; significance level determination means for determining a significance level of monitoring for each of the monitoring targets, based on the content of the monitoring data; display position change means for changing positions where the indexes of a part of the monitoring targets are displayed from the reference positions allocated to the indexes of the part of the monitoring targets to post-movement positions where the indexes are moved according to the significance level of a significant monitoring target, which corresponds to the significance level higher at least than the significance level indicating that the monitoring target is normal, so that the significant monitoring target does not overlap with the indexes of the other monitoring targets on the display area; and index display means for displaying the indexes on the display area based on the reference positions and the post-movement positions allocated by the reference position allocation means, reference positions of which have been changed by the display position change means.

A monitoring state display method according to the present invention comprises: a reference position allocation step of allocating reference positions, when displaying indexes indicating a plurality of monitoring targets on a predetermined display area, to the indexes respectively; a monitoring data acquisition step of acquiring monitoring data on the monitoring targets; a significance level determination step of determining a significance level of monitoring for each of the monitoring targets based on the content of the monitoring data; a display position change step of changing positions where the indexes of a part of the monitoring targets are displayed from the reference positions allocated to the indexes of the part of the monitoring targets to post-movement positions where the indexes are moved according to the significance level of a significant monitoring target, which corresponds to the significance level higher at least than the significance level indicating that the monitoring target is normal, so that the significant monitoring target does not overlap with the indexes of the other monitoring targets on the display area; and an index display step of displaying the indexes on the display area based on the reference positions allocated in the reference position allocation step, and the post-movement positions, reference positions of which have been changed in the display position change step.

A monitoring state display program according to the present invention causes a computer to execute each step included in the monitoring state display method.

According to the present invention, a problem area of a system can be grasped quickly and accurately.

DETAILED DESCRIPTION

A monitoring state display apparatus, a monitoring state display method and a monitoring state display program will now be described with reference to attached diagrams.

First Embodiment

The functional configuration of the monitoring state display apparatus according to the first embodiment will be described first with reference to FIG. 1. The monitoring state display apparatus 1 functionally has a data acquisition unit (monitoring data acquisition means) 11, a significance level determination unit (significance level determination means) 12, a reference position allocation unit (reference position allocation means) 13, a display position change unit (display position change means) 14, and a display control unit (index display means) 15, for example.

Here the monitoring state display apparatus 1 physically comprises a CPU (Central Processing Unit), a memory 20, an input device 30 and a display 40, for example. The memory 20 includes, for example, a ROM (Read Only Memory) and a HDD (Hard Disk Drive), which store programs and data to be processed by the CPU, and a RAM (Random Access Memory), that is used as various work areas primarily for control processing. The input device 30 includes a mouse and a keyboard, for example. These elements are interconnected via a bus. The later mentioned function of each component of the monitoring state display apparatus 1 can be implemented by the CPU executing the programs stored in ROM, and processing operations using the data input from the input device 30 and the data developed in RAM.

The data acquisition unit 11 acquires the monitoring data of a plurality of monitoring targets, and stores the data in the monitoring target information table. Examples of the monitoring target are the hardware and middleware constituting a system, a resource such as a network, and an application to implement a service to be provided to a user. Examples of the monitoring data are response time data, operation state data, data for determining dead state, and data on the number of transactions from a user. The monitor data may be directly acquired from each monitoring target, or may be acquired via a monitoring apparatus that collects monitoring data.

The data configuration of the monitoring target information table will be described with reference to FIG. 2. The monitoring target information table has, as the data items, a monitoring target ID item, a response time item and an operation state item, for example. Identification information that uniquely specifies a monitoring target is stored in the monitoring target ID item. Time required for receiving the response from the monitoring target is stored in the response time item. And operation state data on the monitoring target is stored in the operation state item. Examples of the operation state data are operating, stopping according to the operation schedule, and stopping despite the operation schedule.

Figure 1:
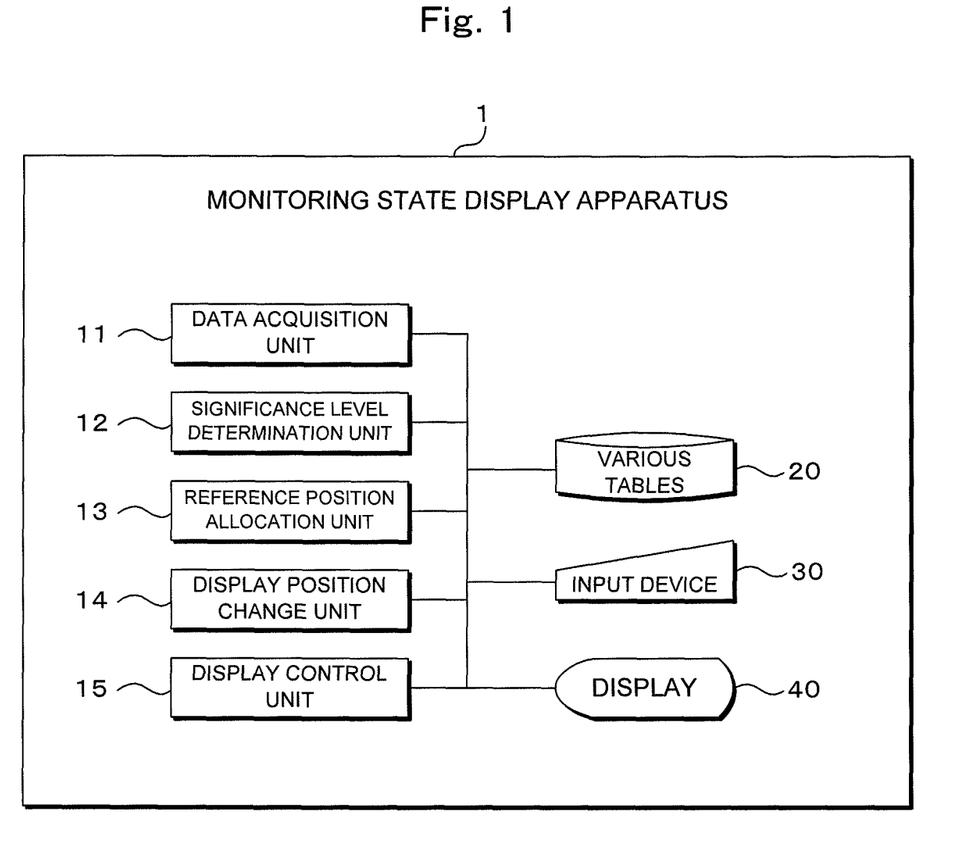
FIG. 1 is a block diagram depicting a functional configuration of a monitoring state display apparatus according to the present embodiment.
Figure 3:
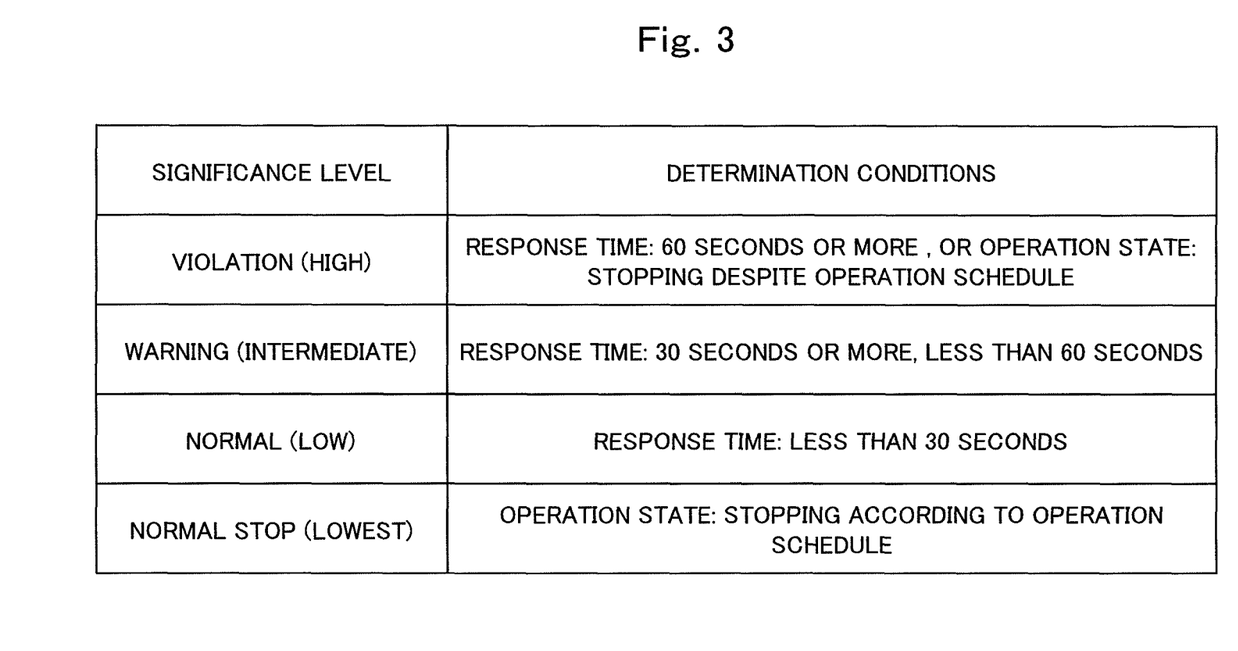
FIG. 3 is diagram depicting a data configuration of a significance level table.

The significance level determination unit 12 depicted in FIG. 1 determines the significance level in the monitoring for each monitoring target, based on the content of the monitoring data acquired from each monitoring target. According to this embodiment, the significance level of monitoring is determined by referring to the significance level table shown in FIG. 3 using the content of the monitoring data, for example. The significance level table in FIG. 3 has significance level items and criteria items. In this significance level table, a criteria for determining the significance level as violation (High) is that the response time is 60 seconds or more, or the operation state is stopping despite the operation schedule. A criteria for determining the significance level as warning (Intermediate) is that the response time is 30 seconds or more, and less than 60 seconds. A criteria for determining the significance level as normal (Low) is that the response time is less than 30 seconds. A criteria for determining the significance level as a normal stop (Lowest) is that the operation state is stopping according to the operation schedule.

The significance level determination unit 12 refers to the criteria item of the significance level table (see FIG. 2) using the response time and the operation state data acquired from each monitoring target, and extracts, from the significance level table (FIG. 3), the significance level stored corresponding to the criteria to which the acquired response time data and the operation state data are applied, whereby the significance level of each monitoring target is decided.

Figure 2:
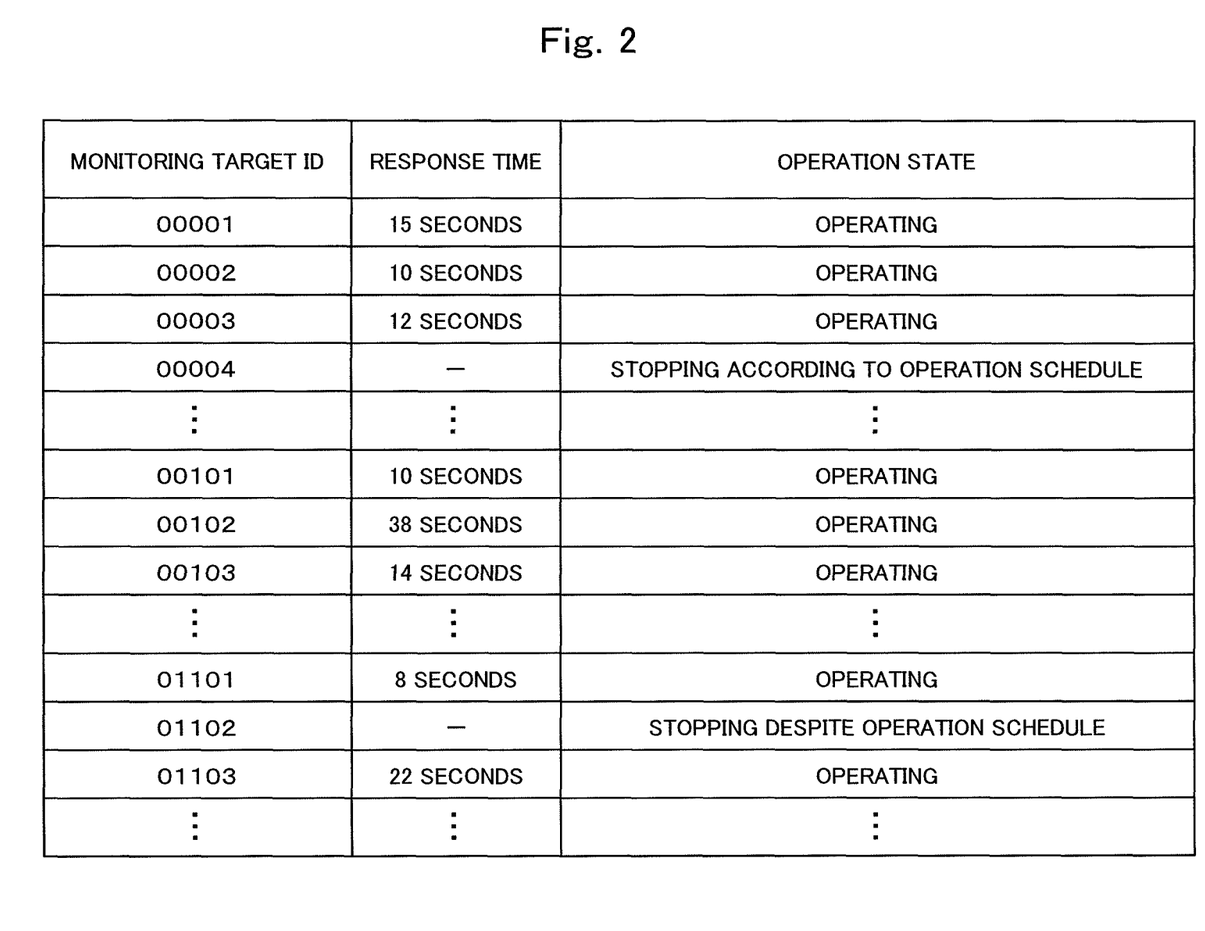
FIG. 2 is a diagram depicting a data configuration of a monitoring target information table.

For example, in the case of the monitoring target of which monitoring target ID is "00001" in FIG. 2, the response time is "15 seconds", so the significance level of this monitoring target is determined as normal (Low). In the case of the monitoring target of which monitoring target ID is "00004", the operation state is "stopping according to the operation schedule", so the significance level is determined as normal stop (Lowest). In the case of the monitoring target of which monitoring target ID is "00102", the response time is "38 seconds", so the significance level is determined as warning (Intermediate). In the case of the monitoring target of which monitoring target ID is "01102", the operation state is "stopping despite the operation schedule", so the significance level is determined as violation (High).

The significance level is not limited to the above mentioned four levels, but any number of levels can be set. The condition to determine the significance level is not limited to the above mentioned conditions as well. For example, the conditions may be set using other monitoring data or the conditions may be set using the asset values and the service values of the resources and applications.

The reference position allocation unit 13 shown in FIG. 1 arbitrarily allocates a reference position, to display an index to indicate a monitoring target on a predetermined display area, to each index. The index to indicate a monitoring target may be a dot or an icon. If a dot is used for the index, more indexes can be displayed on the display area. The display area is set according to the display capacity of the display 40. If the number of monitoring targets is greater than the number of indexes that can be displayed on the display area, indexes of a plurality of monitoring targets may be allocated to one reference position.

The reference position of each index may be allocated so that each index of related monitoring targets come close together. For example, monitoring data, such as the response time, of the monitoring target may be set on the ordinate of the display area, and evaluation data, such as the asset value and the service value of the monitoring target, may be set on the abscissa of the display area, so that each point of the coordinate system formed in the display area may be allocated as a reference position of an index of each monitoring target. In this case, the reference positions may be changed and reallocated every time data, that is set on an ordinate or abscissa, is changed.

If there is a monitoring target of which significance level is warning (Intermediate) or higher (hereafter called "significant monitoring target"), by means of the display position change unit 14 a display position of an index of another monitoring target, which has a reference position near the display position of the index of the significant monitoring target, is changed from the reference position to the display position after the movement (hereafter called "post-movement position"), so as to be away from the display position of the index of the significant monitoring target. The amount of moving amount of the index of another monitoring target from the reference position is larger as the significance level of the significance monitoring target is higher, and is also larger as the reference position of the index of the other monitoring target to be moved is closer to the display position of the index of the significant monitoring target.

Therefore even if the indexes of a plurality of monitoring targets are allocated to one reference position, for example, the index of a significant monitoring target, of which significant level has become warning (Intermediate) or more, can be displayed not to overlap with other indexes by moving other indexes existing in one reference position and its peripheral area away from the index of the significant monitoring target. In other words, the presence of the monitoring targets of which significance level is warning (Intermediate) or higher can stand out on the display screen.

A case when the condition of the significance level for moving the display position is warning (Intermediate) or higher was described, but the condition of the significance level for moving the display position is not limited to warning (Intermediate) or higher. The significance level to be displayed so as to standout more than the other indexes on the display screen can be freely set. In other words, it is sufficient if a monitoring target, which corresponds to a significance level higher at least than the significance level to indicate that the monitoring target is normal, is set as the significant monitoring target, and the indexes of other monitoring targets displayed around the display position of the index of this significant monitoring target can be moved in a direction away from the index of the significant monitoring target.

A concrete method for changing the positions will now be described. Using the significance levels of the monitoring targets and the reference positions of the indexes of the monitoring targets, the display position change unit 14 calculates a movement vector of the index of each monitoring target from the reference position thereof, and calculates a post-movement position using the reference position and the movement vector. The movement vector can be calculated as follows, for example.

In a combination of all the monitoring targets, the display position change unit 14 calculates influence force that acts from other monitoring targets to a own monitoring target using the following Expression 1.

$$F_1 = k * Q_2 / r^2 \quad \text{Expression 1}$$

$F_1$ in Expression 1 is an influence force that acts from another monitoring target on this monitoring target, k is a proportional constant, $Q_2$ is a significance level of the other monitoring target, and r is a distance between the reference position of the index of this own monitoring target and the reference position of the index of the other monitoring target.

Expression 1 is based on Coulomb's Law: ($F=k*q_1*q_2/r^2$). In other words, repulsive force F between two points, determined regarding the significance levels $Q_1$ and $Q_2$ of two monitoring targets as charge quantities $q_1$ and $q_2$, is divided by the significance level $Q_1$ of this own monitoring target, whereby the influence force $F_1$, which acts from the other monitoring target on this own monitoring target, is calculated.

A value allocated according to the significance level is substituted for the significance level $Q_2$ in Expression 1. For example, if the significance level is violation (High), "10" is allocated, if the significance level is warning (Intermediate), "8" is allocated, if the significance level is normal (Low), "1" is allocated, and if the significance level is normal stop (Lowest), "0" is allocated.

By using Expression 1, the relationship in which the influence force (repulsive force) that acts on the own monitoring target increases as the significance level of the other monitoring target is higher, and the relationship in which the influence force (repulsive force) that acts on the own monitoring target increases as the distance between the indexes of the two monitoring targets decreases, can be derived. Thereby the influence force (repulsive force) that acts on the own monitoring target can be increased and the moving amount of this own monitoring target can be increased as the other monitoring target existing near this own monitoring target has a higher significance level. The influence force $F_1$ of Expression 1, on the other hand, is not influenced by the particular significance level of this monitoring target. Therefore even if this significance level of this monitoring target is high, the influence force (repulsive force) that acts on this own monitoring target does not become high, and the moving amount of this monitoring target is not influenced.

If a value to substitute for the significance level $Q_2$ in Expression 1 is appropriately adjusted for each significance level, the influence force (repulsive force) that acts on the own monitoring target can be adjusted for each significance level.

The display position change unit 14 calculates the influence force $F_1$ between this own monitoring target and all the other monitoring targets respectively using Expression 1. The display position change unit 14 calculates a unit vector Ve of a segment connecting the reference position of the index of this own monitoring target and each index of all the other monitoring targets respectively. The display position change unit 14 calculates the influence force vector of the other monitoring targets on this own monitoring targets respectively by multiplying each of the calculated influence force values $F_1$ by the unit vector Ve corresponding to the influence force value $F_1$. The display position change unit 14 calculates the movement vector of this monitoring target by combining all the influence force vectors on this own monitoring target. The display position change unit 14 calculates the post-movement position using the reference position and the movement vector of this own monitoring target. The display position change unit 14 processes all the monitoring targets in a same manner, and calculates the post-movement positions of all the monitoring targets.

The display control unit 15 displays, on the display area, the index of each monitoring target based on the reference position allocated by the reference position allocation unit 13 and the post-movement position calculated by the display position change unit 14.

The display control unit 15 oscillates the index of this own monitoring target according to the influence force that acts on this monitoring target. The magnitude of oscillation increases as the influence acting on this monitoring target increases. In other words, the magnitude of oscillation increases as the moving amount from the reference position to the post-movement position increases. Oscillating the index is not absolutely necessary, and it is sufficient if the display position of the index can be changed. For example, the indexes existing around the index of a significant monitoring target may be rotated around the index of this significant monitoring target.

The display control unit 15 changes a color of an index depending on the significance level of the monitoring target. In concrete terms, a color of an index of a monitoring target, of which significance level is normal stop (Lowest), is gray, a color of an index of a monitoring target, of which significance level is normal (Low), is black, a color of an index of a monitoring target, of which significance level is warning (Intermediate), is yellow, and a color of an index of a monitoring target, of which significance level is violation (High), is red. A shape of an index may be changed depending on the significance level of a monitoring target.

Figure 4:
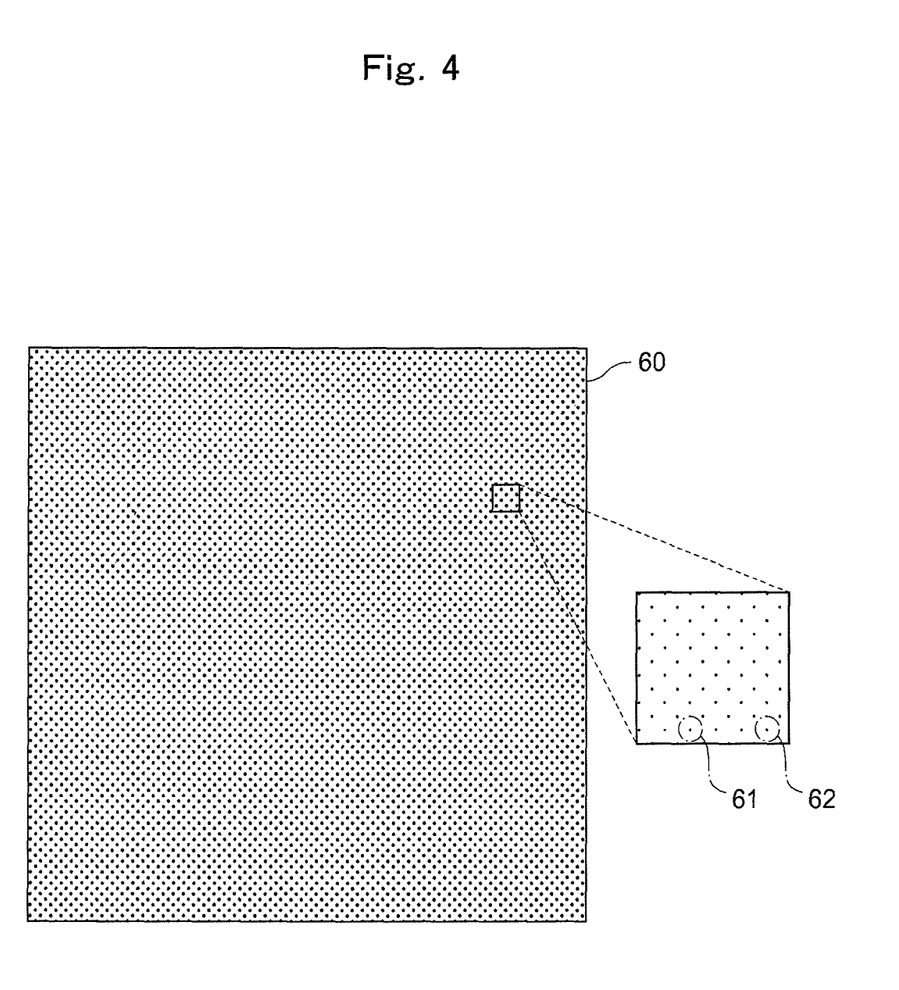
FIG. 4 is a diagram depicting a display screen example when a significant monitoring target does not exist.

FIG. 4 illustrates a display screen example when a significant monitoring target does not exist. Indexes of all the monitoring targets are displayed in the display area 60. For example, the index 61 is an index of a monitoring target of which significance level is normal (Low), and is displayed as a black dot. The index 62 is an index of a monitoring target of which significance level is normal stop (Lowest), and is displayed as a gray dot. Each index oscillates slightly according to the influence that acts on a own monitoring target.

An administrator who views the display screen in FIG. 4 can quickly and accurately grasp that a problem area does not exist.

Figure 5:
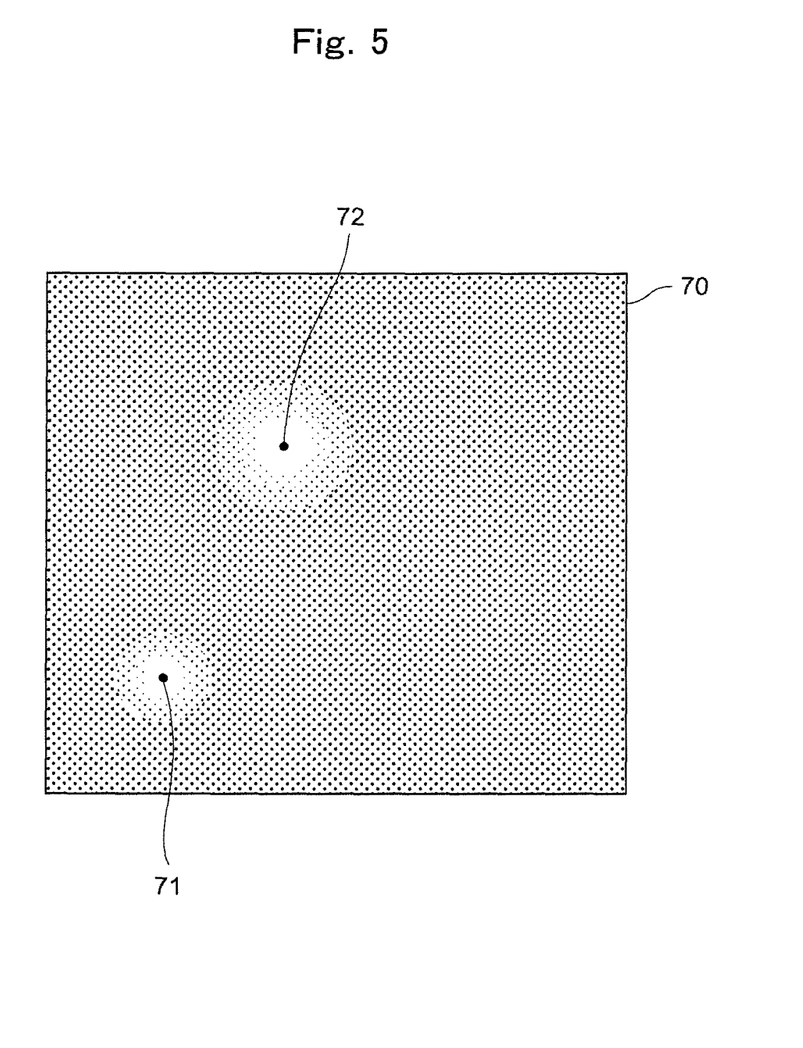
FIG. 5 is a diagram depicting a display screen when significant monitoring targets exist.

FIG. 5 illustrates a display screen example when significant monitoring targets exist. All the monitoring target indexes are displayed in the display area 70. For example, the index 71 is an index of a monitoring target of which significance level is warning (Intermediate), and is displayed as a yellow dot. A group of indexes existing around the index 71 is concentrically scattered around the index 71 according to the influence force (repulsive force) that receives from the index 71, and oscillates more strongly than the other indexes.

The index 72 is an index of a monitoring target of which significance level is violation (High), and is displayed as a red dot. A group of indexes around the index 72 is concentrically scattered around the index 72 according to the influence force (repulsive force) that receives from the index 72, and oscillates much more strongly than the other indexes. The concentrically scattered portion formed around the index 72 is larger than the concentrically scattered portion formed around the index 71. The indexes existing in the scattered portion around the index 72 oscillate more strongly than the indexes existing in the scattered portion around the index 71.

A administrator who views the display screen in FIG. 5 can quickly and accurately grasp that there are two problem areas in the system, and the significance levels of the problems areas are violation (High) and warning (Intermediate) respectively.

If any one index displayed in the display area illustrated in FIG. 4 and FIG. 5 is clicked on by a mouse pointer, for example, the monitoring target information (e.g. monitoring target ID, response time, operation state) corresponding to a specified index is displayed on a popup screen. Thereby the administrator can grasp a concrete state of the monitoring target corresponding to a specified index.

Figure 6:
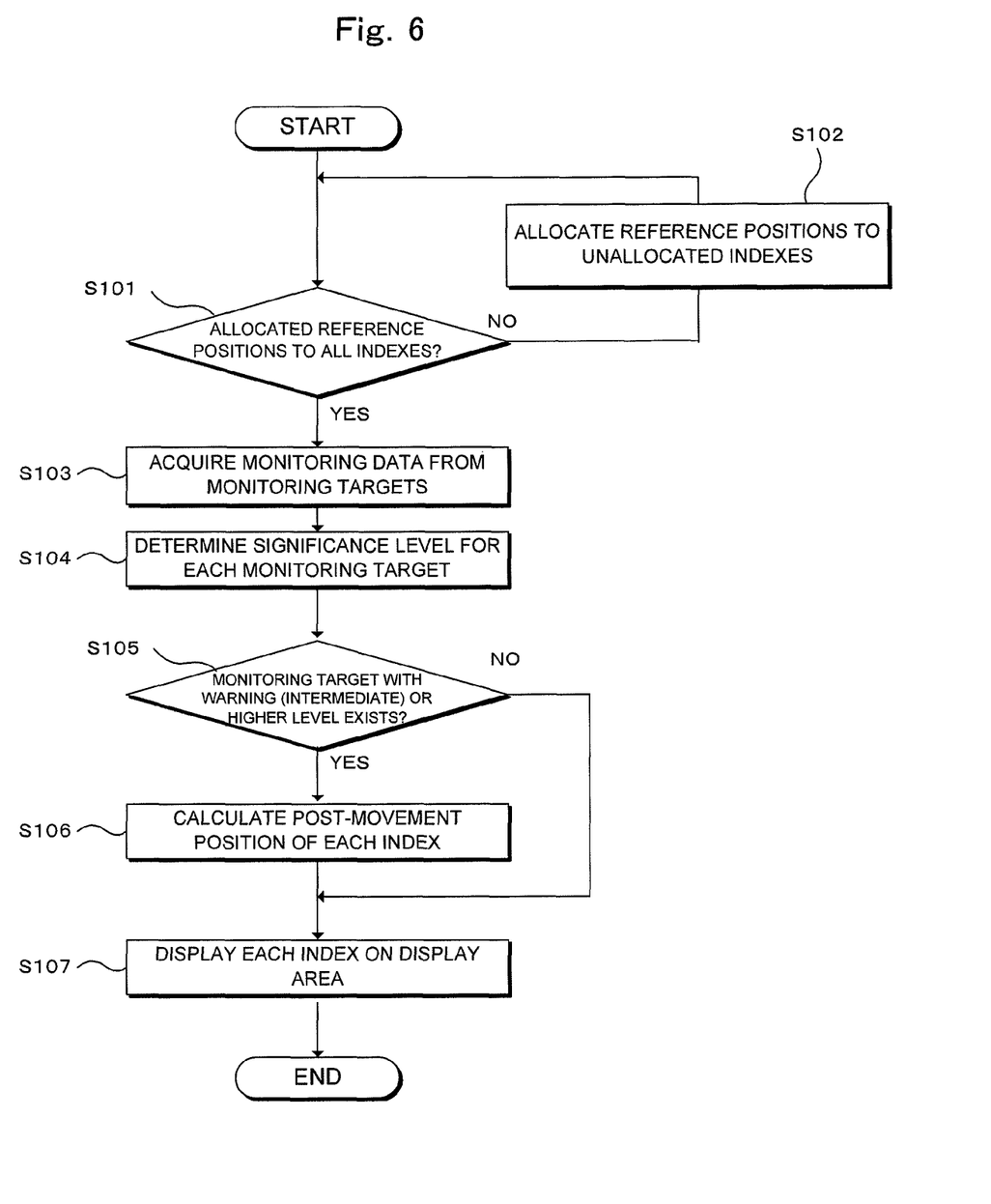
FIG. 6 is a flow chart depicting an operation to display the monitoring state.

Now an operation to display the monitoring state will be described with reference to FIG. 6.

First the reference position allocation unit 13 determines whether the reference positions have been allocated to the indexes of all the monitoring targets (step S101). If the result of this determination is NO (step S101: NO), the reference position allocation unit 13 allocates a reference position to the index of the monitoring target to which a reference position is not allocated (step S102). Processing then moves to step S101.

If it is determined that the reference positions have been allocated in step S101 (step S101: YES), on the other hand, the data acquisition means 11 acquires the monitoring data from each monitoring target (step S103).

Then the significance level determination unit 12 determines a significance level for each monitoring target using the monitoring data acquired from each monitoring target (step S104).

Then the display position change unit 14 determines where a monitoring target, of which significance level is warning (Intermediate) or higher, exists (step S105). If the result of this determination is NO (step S105: NO), processing moves to step S107, which is described later.

If it is determined that a monitoring target, of which significance level is warning (Intermediate) or higher, exists in the determination in step S105 (step S105: YES), the display position change unit 14 calculates a post-movement position of each index that receives influence force (repulsive force) from the significant monitoring target (step S106).

Then the display control unit 15 displays an index of each monitoring target on the display area based on the post-movement position calculated in step S106 and the reference position (step S107).

As mentioned above, according to the monitoring state display apparatus 1 of the first embodiment, the significance level of monitoring is determined based on the monitoring data of each monitoring target, and if a significant monitoring target having a high significance level exists, the other indexes existing around the index of the significant monitoring target are concentrically scattered so as not to overlap with the index of the significant monitoring target, and these indexes existing in the scattered portion can be oscillated more strongly than usual. Thereby the administrator can recognize with certainty the presence of a problem, and grasp the seriousness of the problem based on the size and oscillating state of the concentrically scattered portion formed around the significant monitoring target. As a result, a problem area of the system can be quickly and accurately grasped.

In the above mentioned first embodiment, the influence force is calculated for all the monitoring targets to determine the post-movement positions, but the present invention is not limited to this. For example, an influence force may be calculated only between the significant monitoring target and the monitoring targets of which indexes exist within a predetermined range from the index of the significant monitoring target to determine the post-movement positions, and the other monitoring targets may be displayed in the respective reference positions without determining post-movement positions for these monitoring targets. The indexes of the monitoring targets existing within a predetermined range from the index of the significant monitoring target may be displayed taking a predetermined distance from the index of the significant monitoring target, without calculating the influence force of the monitoring targets, and the other monitoring targets may be displayed in the reference positions.

In the first embodiment, an index of a own monitoring target is oscillated according to the influence force that acts on this own monitoring target, and a color of the index is changed according to the significance level of the monitoring target, but the oscillation and changing color are not absolutely necessary.

Second Embodiment

The second embodiment will now be described. A difference of a monitoring state display apparatus according to the second embodiment from the monitoring state display apparatus according to the first embodiment described above is a function of the display position change unit 14. The rest of the configuration is the same as the configuration of the monitoring state display apparatus of the first embodiment, therefore a same composing element is denoted with a same reference numeral, for which description is omitted. Here the difference from the first embodiment will be primarily described.

The display position change unit 14 according to the second embodiment has a following function, in addition to the functions of the display position change unit 14 according to the first embodiment. When a plurality of significant monitoring targets exist, the display position change unit 14 groups significant monitoring targets of which a part or all of the service contents provided by the significant monitoring targets overlap. Then the display position change unit 14 change the reference positions of the indexes of the significant monitoring targets belonging to a same group to a position at the center of these reference positions.

The grouping condition is not limited to the overlapping of service contents. Any association that monitoring targets share or mutually depend on can be a condition of a grouping.

The reference position of the indexes of the significant monitoring targets belonging to a same group is not limited to the center of each reference position. It is sufficient if the change position is among the reference positions. For example, the reference position of a group may be among each reference position, and may be located near the significant monitoring target of which significance level is the highest, using a ratio of the significance levels of the significant monitoring targets forming the group.

This will be described in concrete terms using the monitoring target information table in FIG. 7. In the measuring target information table in FIG. 7, a service ID item has been added to each data item of the monitoring target information table in FIG. 2. The service ID is identification information that uniquely specifies a service provided by the monitoring target.

Figure 7:
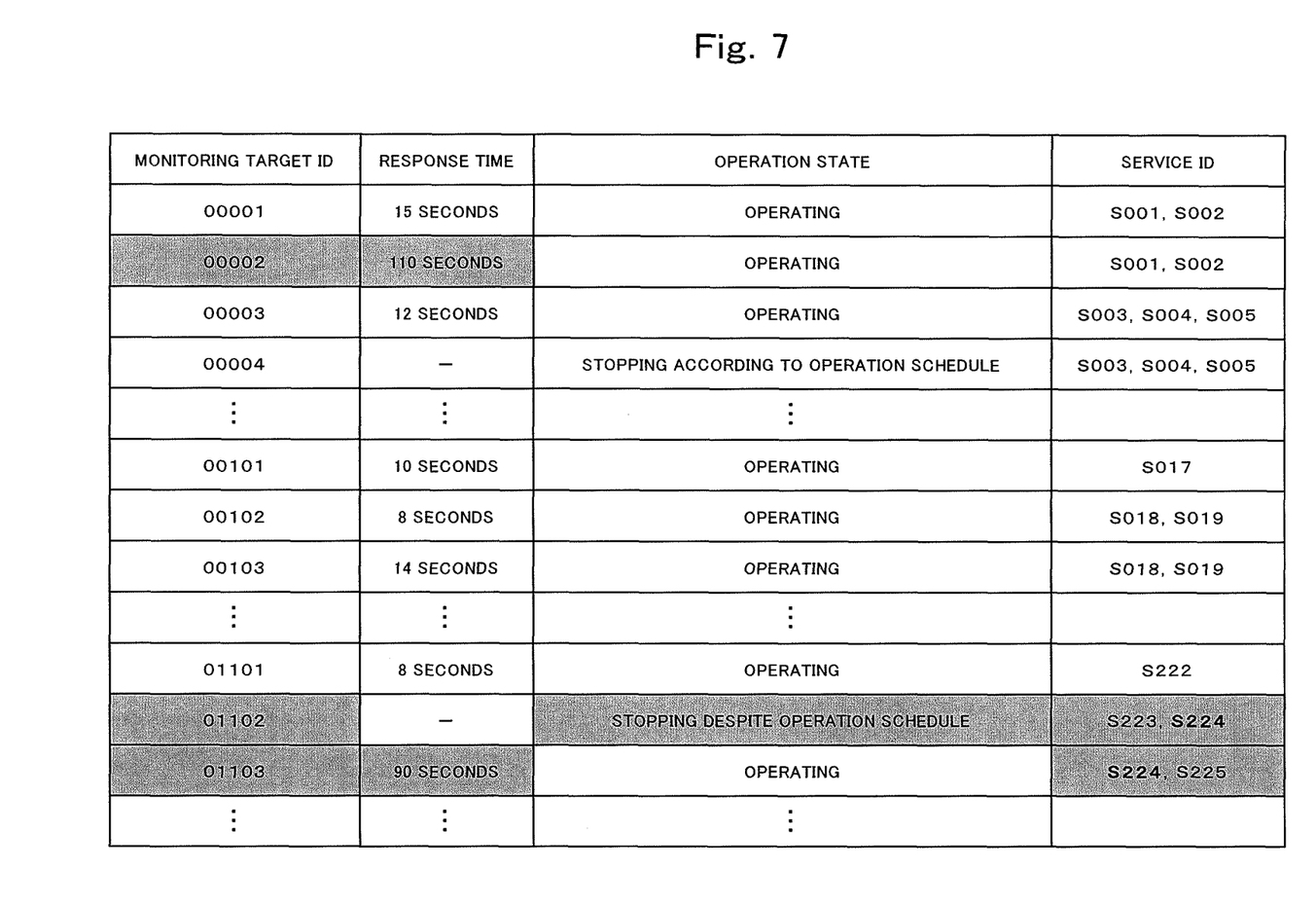
FIG. 7 is diagram depicting a data configuration of a monitoring target information table according to the second embodiment.

When a plurality of significant monitoring targets exist, the display position change unit 14 groups significant monitoring targets having overlapping service IDs, with reference to the service ID in the monitoring target information table in FIG. 7. In FIG. 7, three monitoring targets of which monitoring target IDs are "00002", "01102" and "01103" are significant monitoring targets. "S224", out of the service IDs of these three significant monitoring targets, overlaps in the monitoring targets "01102" and "01103". Therefore the display position change unit 14 groups the monitoring targets "01102" and "01103".

The display portion change unit 14 changes the reference positions of the indexes of the monitoring targets "01102" and "01103", which belong to a same group, to an intermediate position between the reference position of the monitoring target "01102" and the reference position of the monitoring target "01103".

The display position change unit 14 calculates the post-movement position for all the monitoring targets in the same manner as the first embodiment described above. However it is assumed that influence force (repulsive force) does not act among the significant monitoring targets belonging to a same group, and the indexes of the significant monitoring targets belonging to a same group are displayed in a reference position that was changed to an intermediate position.

Figure 8:
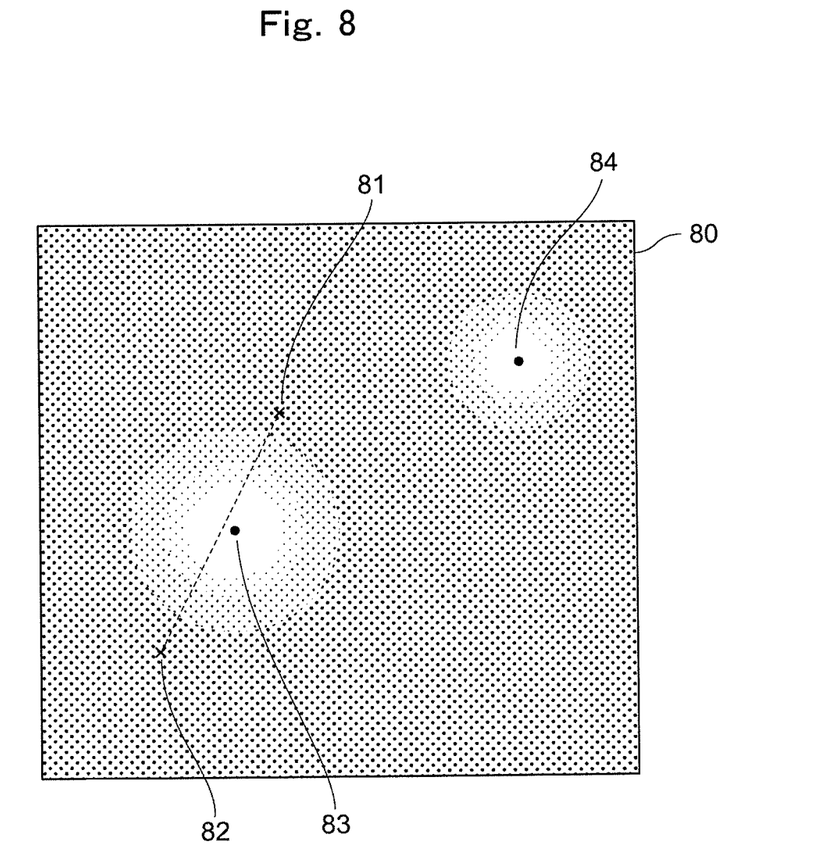
FIG. 8 is a diagram depicting a display screen example when significant monitoring targets belonging to a same group exist.

FIG. 8 illustrates a display screen example when significant monitoring targets belonging to a same group exist. In the display area 80, indexes of all the monitoring targets are displayed. Symbol x 81 indicates a reference position of the monitoring target "01102" shown in FIG. 7, before a change, and symbol x 82 is a reference position of the monitoring target "01103" shown in FIG. 7 before a change. The index 83 is a center position between x 81 and x 82. In other words, the index 83 is the reference position after the change of the monitoring targets "01102" and "01103" belonging to a same group. Indexes existing around the index 83 receive influence force (repulsive force) from the two significant monitoring targets respectively, so the concentrically scattered portion formed around the index 83 becomes much larger than the concentrically scattered portion formed around the index 84 of one significant monitoring target. The indexes existing in the scattered portion around the index 83 oscillate more strongly than the indexes existing in the scattered portion around the index 84.

The system administrator who views the display screen in FIG. 8 can quickly and accurately grasp that a problem more serious than an isolated problem is occurring.

If the index 83 in FIG. 8 is clicked on by a mouse pointer, for example, the monitoring target information (e.g. monitoring target ID, response time, operation state and service ID) on the monitoring targets "01102" and "01103" are displayed on a popup screen. Thereby the administrator can comprehensively grasp a concrete state of the significant monitoring targets belonging to a same group.

As mentioned above, according to the monitoring state display apparatus 1 of the second embodiment, significant monitoring targets providing similar services are grouped as related monitoring targets, and displayed on a same display position, whereby influence force (repulsive force) on other indexes can be enhanced. As a result, the occurrence of a problem more serious than an isolated problem can be reported, and the administrator can recognize problems having close connection as one core problem.

Modifications

The above mentioned embodiments are merely examples, and do not exclude the use of numerous modifications and techniques not explicitly disclosed in the embodiments. In other words, the present invention can be modified in various modes without departing from the true spirit and scope of the invention.

Figure 9:
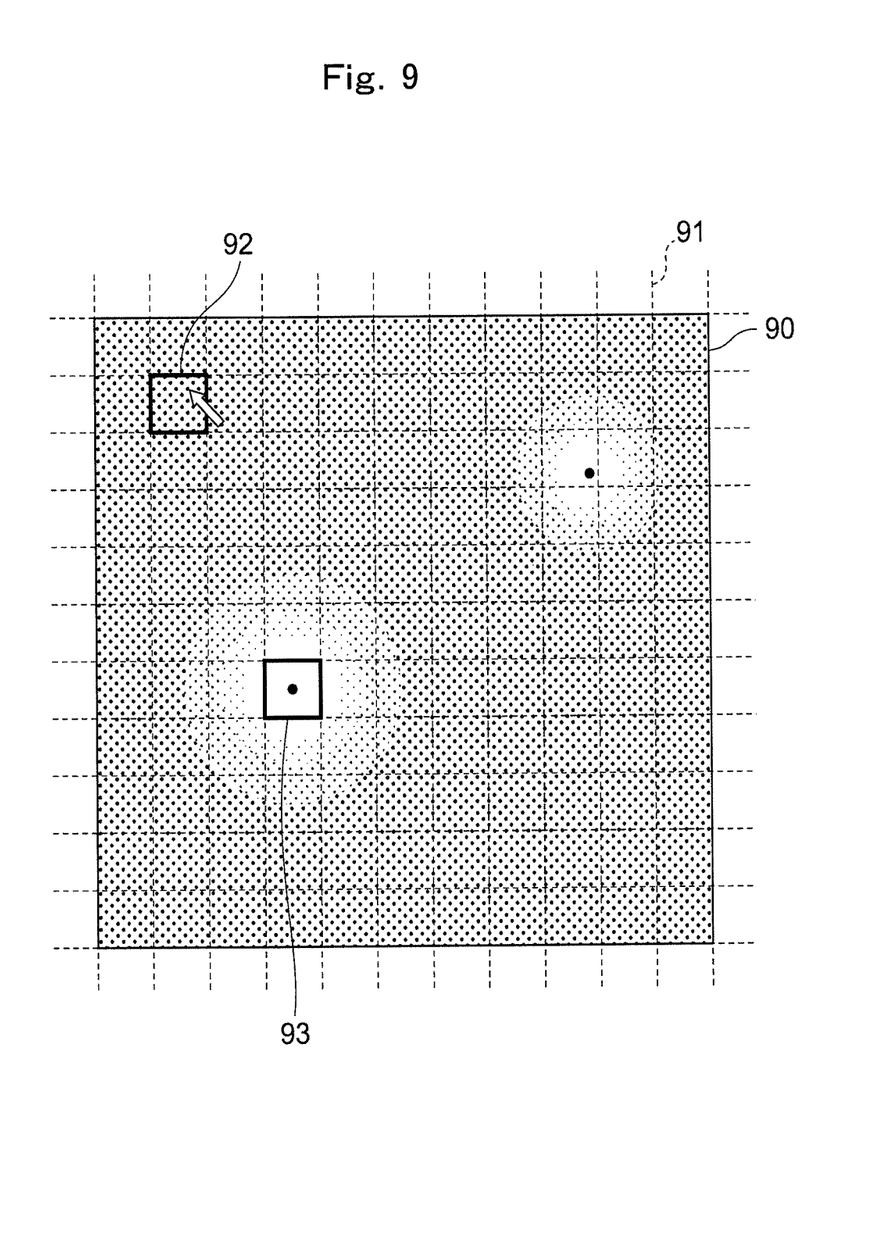
FIG. 9 is a diagram depicting a display screen example when divided areas are created according to a modification.

For example, in each of the above mentioned embodiments, the monitoring target information corresponding to the specified index is displayed by specifying and clicking on the index displayed in the display area, but a method for displaying the monitoring target information is not limited to this. For example, as FIG. 9 illustrates, the display control unit (divided display means) 15 divides the display area 90 with drawn lines 91 in a mesh, and if one of the divided areas is clicked on with a mouse pointer, for example, the monitoring target information corresponding to each index existing in the specified divided area is displayed on the popup screen (e.g. table). Thereby a concrete state of a monitoring target can be easily grasped by specifying a divided area, even if an index is so small that specifying one index is not easy.

Figure 10:
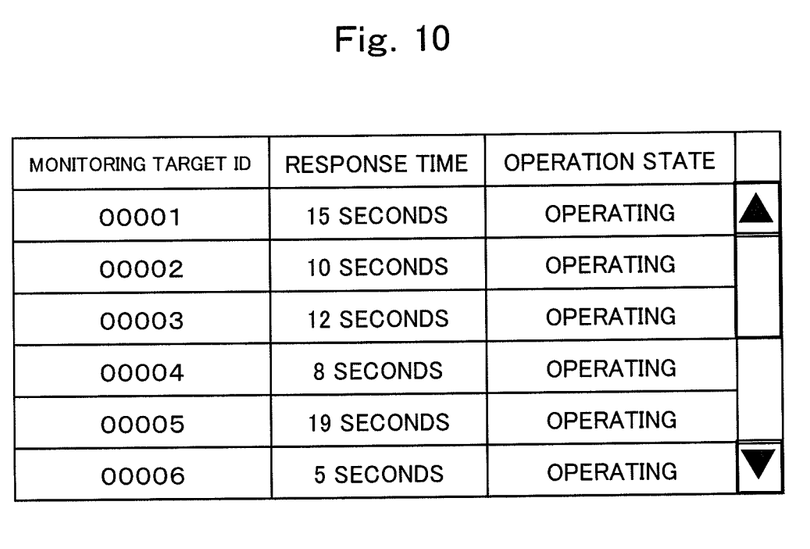
FIG. 10 is diagram depicting an example of a popup screen when the divided area according to the modification is specified.
Figure 11:
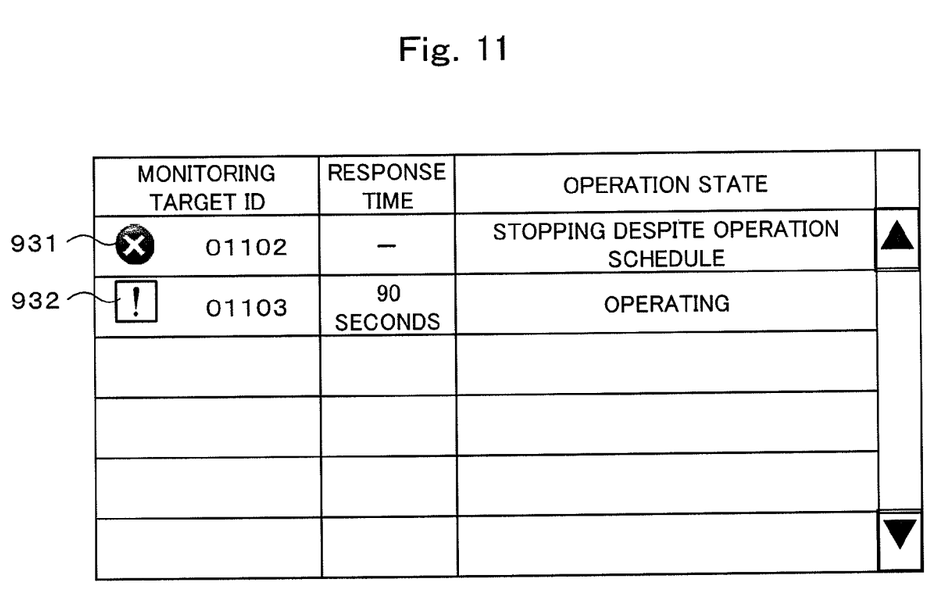
FIG. 11 is diagram depicting an example of a popup screen when the divided area according to the modification is specified.

In concrete terms, if a divided area 92 in FIG. 9 is specified, the popup screen in FIG. 10 is displayed, and if a divided area 93 in FIG. 9 is specified, the popup screen in FIG. 11 is displayed. The divided area 93 in FIG. 9 includes an index of grouped significant monitoring targets, and in the popup screen in FIG. 11 icons 931 and 932, to indicate a significance level of each significant monitoring target, are displayed respectively.

Here the display control unit (divided display means) 15 may calculate a density of indexes for each divided area, based on the arrangement information of each index, so that the display area of a divided area may be larger as the calculated density of a divided area is smaller. Then a divided area, where significant monitoring targets exist and the density of indexes is small can be displayed as larger than the other display areas.

In each of the embodiments described above, the present invention is executed as one monitoring state display apparatus, but the present invention may be executed as a plurality of monitoring state display apparatuses. In this case, each function of the monitoring state display apparatus, according to each of the embodiments described above, can be distributed into a plurality of apparatuses, so that these plurality of apparatuses function in the same manner as the monitoring state display apparatus according to each of the embodiments described above.

This application declares priority based on Japanese Patent Application No. 2009-270078, applied on Nov. 27, 2009, and includes all disclosures thereof.

Although the present invention has been described with reference to the embodiments, the present invention is not limited to these embodiments. Numerous modifications can be made to the configuration and detail of the present invention by those skilled in the art, without departing from the scope of the invention.

The monitoring state display apparatus, monitoring state display method and monitoring state display program according to the present invention are suitable for allowing to grasp a problem area of a system quickly and accurately.

1 monitoring state display apparatus
11 data acquisition unit
12 significance level determination unit
13 reference position allocation unit
14 display position change unit
15 display control unit
20 memory
30 input device
40 display

What is claimed is:

1. A monitoring state display apparatus comprising:
reference position allocation unit for allocating reference positions, when displaying indexes indicating a plurality of monitoring targets on a predetermined display area, to the indexes respectively;
monitoring data acquisition unit for acquiring monitoring data on the monitoring targets;
significance level determination unit for determining a significance level of monitoring for each of the monitoring targets, based on the content of the monitoring data;
display position change unit for changing positions where the indexes of a part of the monitoring targets are displayed from the reference positions allocated to the indexes of the part of the monitoring targets to post-movement positions where the indexes are moved according to the significance level of a significant monitoring target, which corresponds to the significance level higher at least than the significance level indicating that the monitoring target is normal, so that the significant monitoring target does not overlap with the indexes of the other monitoring targets on the display area; and
index display unit for displaying the indexes on the display area based on the reference positions allocated by the reference position allocation unit, and the post-movement positions changed by the display position change unit.

2. The monitoring state display apparatus according to claim 1, wherein
the display position change unit moves the indexes of the part of the monitoring targets so that these indexes are more distant from the index of the significant monitoring target as the reference position of indexes of the part of the monitoring targets is closer to the reference position of the index of the significant monitoring target.

3. The monitoring state display apparatus according to claim 1, wherein
the index display means controls the change amount of the index in the display position according to the moving amount from the reference position to the post-movement position.

4. The monitoring state display apparatus according to claim 1, wherein
when a plurality of significant monitoring targets exist, the display position change unit groups the significant monitoring targets, a part or all of the data of which indicate association among the monitoring targets overlap, and changes each of the reference positions of the indexes of the significant monitoring targets belonging to a same group to a position among of the reference positions respectively.

5. The monitoring state display apparatus according to claim 1, further comprising a divided display unit for displaying the monitoring data in divided areas formed by dividing the display area into a plurality of areas, wherein
when any of the divided areas is specified, the divided display unit displays information on the monitoring target corresponding to the index located in the specified divided area.

6. The monitoring state display apparatus according to claim 5, wherein
the divided display unit calculates the density of the indexes in each of the divided areas based on the arrangement information of the indexes, and displays in such a way that the display area of the divided area is larger as the calculated density in the divided area is smaller.

7. A memory configured to store code that, when executed, causes a computer to implement a monitoring state display method, the method comprising:
allocating reference positions, when displaying indexes indicating a plurality of monitoring targets on a predetermined display area, to the indexes respectively;
acquiring monitoring data on the monitoring targets;
determining a significance level of monitoring for each of the monitoring targets based on the content of the monitoring data;
changing positions where the indexes of a part of the monitoring targets are displayed from the reference positions allocated to the indexes of the part of the monitoring targets to post-movement positions where the indexes are moved according to the significance level of a significant monitoring target, which corresponds to the significance level higher at least than the significance level indicating that the monitoring target is normal, so that the significant monitoring target does not overlap with the indexes of the other monitoring targets on the display area;
displaying the indexes on the display area based on the reference positions allocated in the reference position allocation step, and the post-movement positions changed in the display position change step; and
a processor configured to execute the code to implement the method.

8. A non-transitory computer-readable medium configured to execute a monitoring state display program comprising:
a reference position allocation step of allocating reference positions, when displaying indexes indicating a plurality of monitoring targets on a predetermined display area, to the indexes respectively;
a monitoring data acquisition step of acquiring monitoring data on the monitoring targets;
a significance level determination step of determining a significance level of monitoring for each of the monitoring targets based on the content of the monitoring data;
a display position change step of changing positions where the indexes of a part of the monitoring targets are displayed from the reference positions allocated to the indexes of the part of the monitoring targets to post-movement positions where the indexes are moved according to the significance level of a significant monitoring target, which corresponds to the significance level higher at least than the significance level indicating that the monitoring target is normal, so that the significant monitoring target does not overlap with the indexes of the other monitoring targets on the display area; and an index display step of displaying the indexes on the display area based on the reference positions allocated in the reference position allocation step, and the post-movement positions changed in the display position change step.

* * * * *